Jan. 12, 1960   R. F. KRUPP ET AL   2,920,751
CHAIN TIGHTENER
Filed Dec. 3, 1956   2 Sheets-Sheet 1
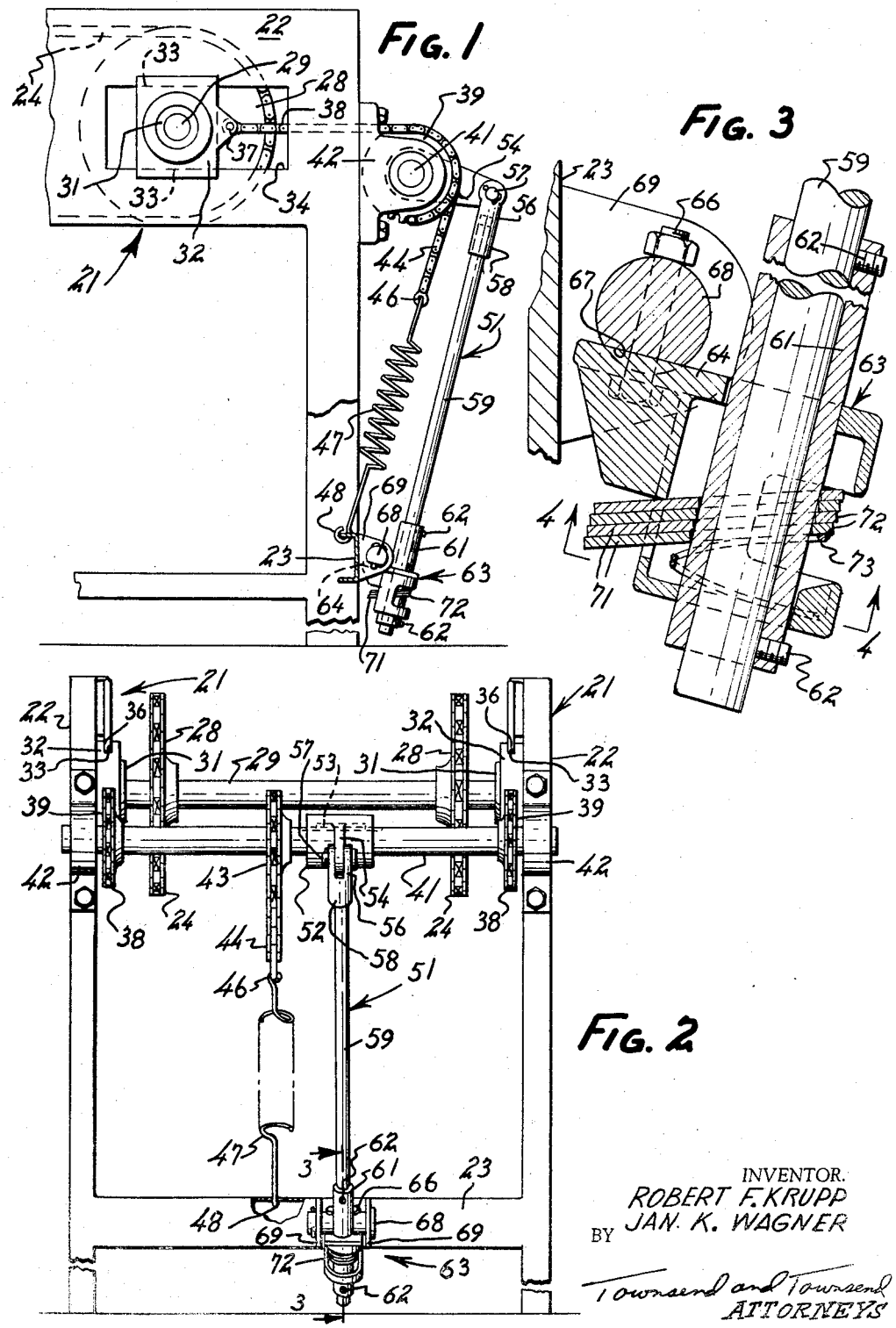
INVENTOR.
ROBERT F. KRUPP
JAN K. WAGNER
BY
Townsend and Townsend
ATTORNEYS Jan. 12, 1960 R. F. KRUPP ET AL 2,920,751
CHAIN TIGHTENER
Filed Dec. 3, 1956 2 Sheets-Sheet 2
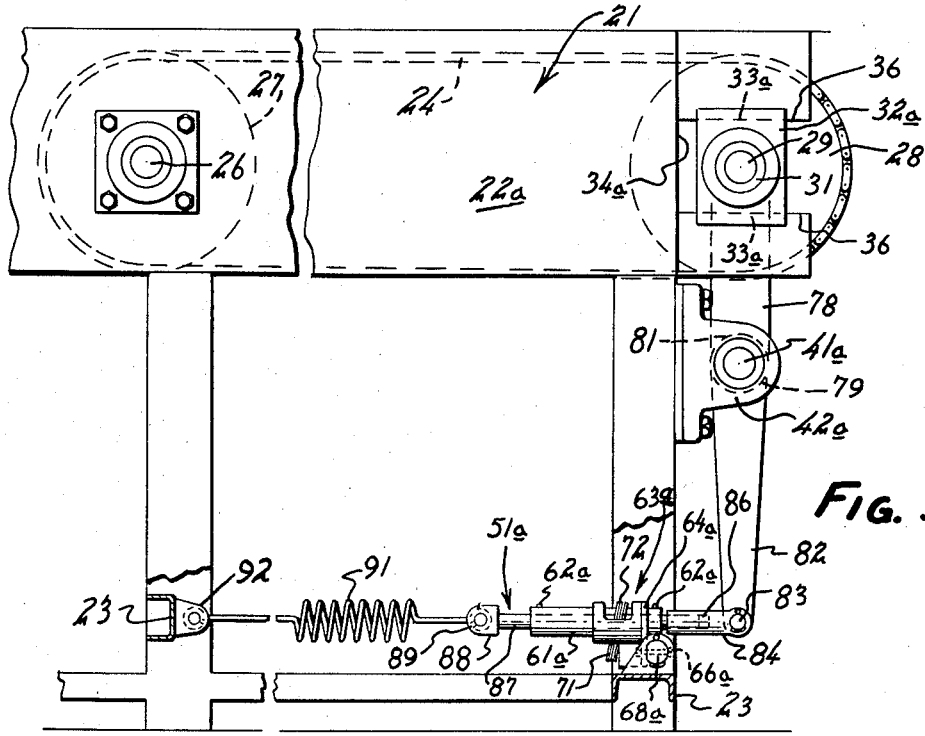
FIG. 5
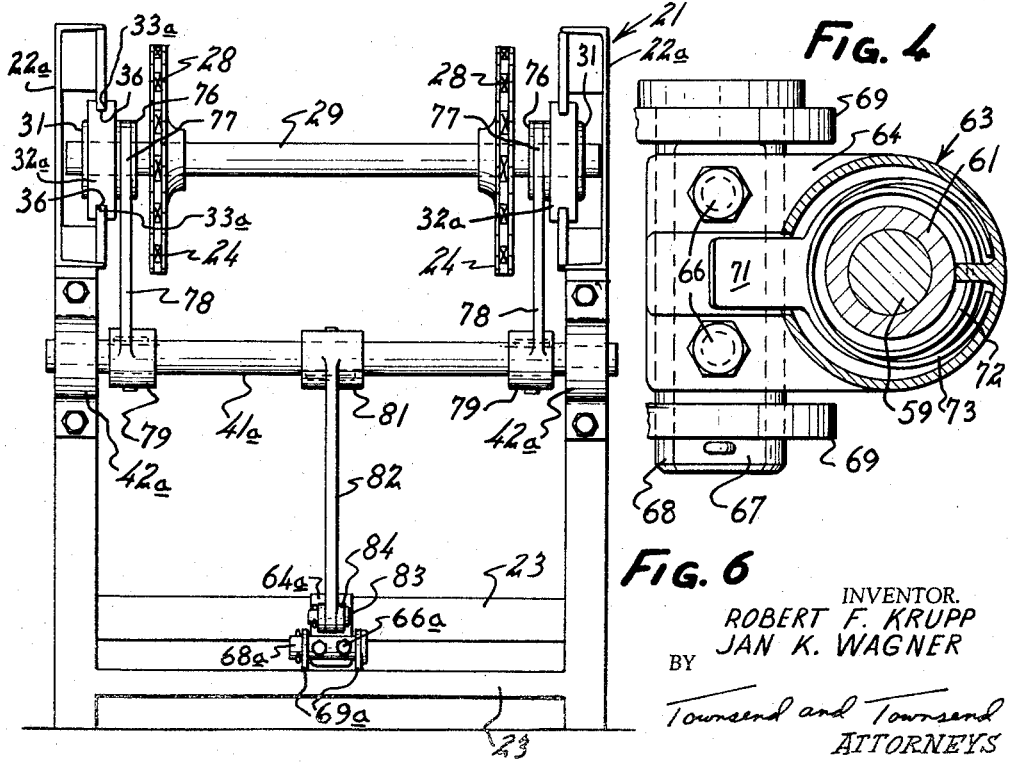
FIG. 4
FIG. 6
INVENTOR.
ROBERT F. KRUPP
JAN K. WAGNER
BY
Townsend and Townsend
ATTORNEYS

United States Patent Office 2,920,751
Patented Jan. 12, 1960

2,920,751

CHAIN TIGHTENER

Robert F. Krupp and Jan K. Wagner, Oakland, Calif., assignors to Gerber Products Company, Fremont, Mich., a corporation of Michigan Application December 3, 1956, Serial No. 625,705

11 Claims. (Cl. 198—208)

This invention relates to a new and improved chain tightener. Reference is made to co-pending application Serial No. 519,318, filed July 1, 1955, now Patent No. 2,826,207, for Glass Jar Washing Machine, out of which part of the subject matter of the instant application has been divided.

The principal object of the present invention is to apply continuous tension to one or more endless chains installed in a machine. More particularly the invention has application in installations where endless roller chains are employed for such purposes as conveyors, the invention hereinafter described functioning to apply greater tension to the shorter of two parallel chains so that the life of the chains is substantially extended.

In certain types of machines endless roller chains are employed reeved about sprockets on shafts at opposite ends of the machine. With the passage of time, the chains tend to wear and lengthen. The present invention affords means for applying a substantially constant tension to the chains as they wear. Frequently either initially or after an interval of time, one of the chains tends to be longer than the other. The present invention functions to apply the major tensioning force to the shorter of the two chains so that ultimately the two chains wear out simultaneously, thereby extending the overall life of the chains and reducing maintenance expense of the machine.

Still another feature of the invention is the elimination of the maladjustment frequently occasioned by manual tightening of the chains as commonly practiced in industry.

The forces tending to pull one of the shafts carrying the sprockets about which the chains are reeved toward the other differs when the machine is in operation at high speed from the force existing when the machine is in operation at low speed or is at rest. As hereinafter appears, the instant invention provides means for gradually moving the shafts away from each other as the chains wear. However, one of the features of the invention is the provision of a one-way stop which permits the shafts to move apart under tension as the chains wear, but which does not permit a reverse movement. Accordingly, when the machine is operating, the dynamic forces tend to draw the two shafts together and the dynamic forces are terminated when the machine stops, thereby permitting the shafts to move farther apart under the same tension. The stop hereinafter described prevents the to and fro movement of the shafts relative to each other which would otherwise occur with the application and cessation of the dynamic forces.

Other objects of the present invention will become apparent upon reading the following specification and referring to the accompanying drawings in which similar characters of reference represent corresponding parts in each of the several views.

In the drawings:

Fig. 1 is a side elevation of a portion of a machine in which the instant invention is installed, partly broken away in section;

Fig. 2 is an end elevation of the structure of Fig. 1;

Fig. 3 is an enlarged fragmentary sectional view taken substantially along line 3—3 of Fig. 2;

Fig. 4 is a sectional view taken substantially along line 4—4 of Fig. 3;

Fig. 5 is a side elevation of a portion of the machine in which a modification of the invention is installed, the view being partly broken away in section; and Fig. 6 is an end elevation of the structure of Fig. 5.

The present invention is adapted to a wide variety of machines, the nature of which forms no part of the present invention. As partially shown in the accompanying drawings, such a machine generally employs a frame 21 made up of a plurality of members including two longitudinally extending side members 22 on opposite sides of the machine interconnected by a plurality of transverse members 23. Extending longitudinally of the machine is a pair of continuous roller chains 24. At one end of the machine is a drive shaft 26 on which are mounted sprockets 27 around which chains 24 are reeved. At the opposite end of the machine is a pair of idler sprockets 28 around which chains 24 pass, sprockets 28 being mounted on transverse idler shaft 29. The opposite ends of shaft 29 are received in bearings 31 mounted in blocks 32. The upper and lower edges of blocks 32 are grooved to form slideways 33 and blocks 32 are positioned to slide in longitudinally extending rectangular openings 34 in side members 22. The portions 36 of side members 22 surrounding the upper and lower edge of openings 34 fit into slideways 33 of blocks 32 and hence the blocks 32 may move longitudinally with respect to frame 21, thereby permitting idler shaft 29 to move toward and away from drive shaft 26 at the opposite end of the machine.

As chains 24 wear with the passage of time, shaft 29 is moved to the right, as shown in Fig. 1, as hereinafter appears.

Each block 32 is fastened by means of pin 37 to one end of tightening chain 38 which comprises a section of roller chain, the opposite end of which passes around and is fixed to sprocket 39. Sprocket 39 is keyed to transversely extending adjustment shaft 41 which is fastened to the ends of frame 21 by means of pillow blocks 42. Likewise fastened to adjustment shaft 41 is a sprocket 43 around which passes a section 44 of roller chain to the end of which is fastened by means of an eye 46 one end of coil spring 47. The opposite end of coil spring 47 is attached by means of an eye 48 to transverse frame member 23. Accordingly spring 47 exerts a torque upon adjustment shaft 41 which is transmitted to tightening chains 38 and the greatest force is applied to block 32 which is farthest to the left as viewed in Fig. 1. As chains 24 tend to wear, blocks 32 move toward the right, thereby exerting a substantially constant tension to chains 24.

When the machine is in operation the dynamic forces tend to pull idler shaft 29 to the left and when the machine comes to rest, spring 47 tends to move shaft 29 to the right. In order to overcome what would otherwise be an undesirable to and fro movement of shaft 29, a stop member 51 is provided. It will be understood that stop member 51 herein illustrated and described is only one of a variety of members which might be employed to perform a similar function. As illustrated herein, a fitting 52 is keyed by means of key 53 to adjustment shaft 41, there being an arm 54 projecting radially from fitting 52. A bifurcated member 56 is connected to the outer end of arm 54 by means of pin 57, the opposite end 58 of bifurcated member 56 being threaded to receive one end of threaded rod 59, the opposite end of which is received in sleeve 61 adjustably fastened thereto by means of set screw 62. Sleeve 61 is received in an adjustable clamp 63. One adjustable clamp which may be employed is of a type commercially available and shown in Patent No. 1,783,713. An ear 64 projecting from clamp 63 is fastened by means of bolts 66 to a flattened portion 67 on pin 68 which is rotatably mounted in ears 69 projecting from transverse frame member 23. Accordingly rod 59 and sleeve 61 may move downwardly as spring 47 gradually moves idler shaft 29 to the right. Pivot pins 57 and 68 prevent binding as arm 54 changes its angular position. Reverse movement of rod 59 is prevented by adjustable clamp 63 and accordingly idler shank 29 may move to the right, but may not move in the reverse direction unless an attendant releases clamp 63. Release of clamp 63 may be accomplished by moving the outwardly projecting tongue pieces 71 of the plurality of loops 72 which surround sleeve 61 against the force of coil spring 73.

In the modification shown in Figs. 5 and 6, idler shaft 29 is journalled in bearings 31 in blocks 32ª which slide in openings 34ª in the ends of side frame members 22ª. Hubs 76 on blocks 32ª are received in the bifurcated upper ends 77 of arms 78. The opposite ends of arms 78 are provided with collars 79 which are keyed to transversely extending adjustment shaft 41ª mounted on frame 21 by means of pillow blocks 42ª. Adjustment shaft 41ª carries a fitting 81 from which extends downwardly arm 82, the lower end of which is fastened by means of pivot pin 83 to the bifurcated end 84 of member 86. Member 86 is interiorly threaded and receives one end of rod 87, the opposite end of which is received in fitting 88 attached by means of eye 89 to coil spring 91. The opposite end of coil spring 91 is fastened by means of fitting 92 to transverse frame member 23. Accordingly the force of spring 91 is transmitted through rod 87 to exert a torque to adjustment shaft 41ª and this torque is transmitted to blocks 32ª tending to move shaft 29 to the right, as viewed in Fig. 5.

A stop member 51ª is provided to prevent return movement of rod 87. For such purpose a sleeve 61ª is attached by means of set screws 62ª to rod 87. Adjustable clamp 63ª similar to that shown in the preceding modification engages sleeve 61ª. The projecting ear 64ª of clamp 63ª is fastened by means of bolts 66ª to a flattened portion 67ª of pivot pin 68ª rotatably mounted in ears 69ª on transverse frame member 23.

It will be seen that in both of the modifications heretofore described a tension is applied by means of springs 47 and 91 tending to pull shafts 29 to the right, as viewed in Figs. 1 and 5. The force of the springs is applied to the shorter of the two chains 24, thereby causing the shorter chain to wear at a faster rate than the longer chain until the two are equal in length and thereafter the force is applied to both chains simultaneously, thereby lengthening the chain life. Furthermore, tension applied to chains 24 throughout their lives is substantially constant. In both modifications a stop member 51 is provided which permits shafts 29 to move to the right, but does not permit reverse movement when the dynamic forces set up by operation of the machine tend to move the shaft to the left.

Although the foregoing invention has been described in some detail by way of illustration and example for purposes of clarity of understanding, it is understood that certain changes and modifications may be practiced within the spirit of the invention and scope of the appended claims.

What is claimed is:

1. In combination, a frame, a pair of continuous conveyor chains of substantially the same length, a first shaft in said frame, a pair of sprockets on said first shaft around which said chains pass, a second shaft, a second pair of sprockets on said second shaft around which said chains pass, means for mounting said second shaft in said frame to vary the distance between corresponding sprockets on said shafts, a first and a second bearing adjacent opposite ends of said second shaft, a third shaft substantially parallel to said second shaft, a first tensioning chain connected to said first bearing, a first tensioning sprocket on said third shaft and connected to said first tensioning chain, a second tensioning chain connected to said second bearing, a second tensioning sprocket on said third shaft and connected to said second tensioning chain, and spring means applying torque to said third shaft.

2. The combination of claim 1 which further comprises an arm on said third shaft, a rod pivotally connected to said arm, and a clamp on said frame engaging said rod and permitting said rod to move in only one direction to move said first and second shafts apart.

3. In combination, a frame, a pair of continuous conveyor chains of substantially the same length, a first shaft in said frame, a pair of sprockets on said first shaft around which said chains pass, a second shaft, a second pair of sprockets on said second shaft around which said chains pass, a first and a second bearing adjacent opposite ends of said second shaft, mounting means for independently mounting said bearing for longitudinal movement on said frame, a third shaft substantially parallel to said second shaft, resilient means applying torque to said third shaft, first means interconnecting said first bearing and said third shaft to transfer torque applied to said third shaft to bias said first bearing away from said first shaft, and second means independent of said first means interconnecting said second bearing and said third shaft to transfer torque applied to said third shaft to bias said second bearing away from said first shaft.

4. The combination of claim 3 in which said first means comprises a first tensioning chain connected to said first bearing and a first tensioning sprocket on said third shaft and connected to said first tensioning chain and in which said second means comprises a second tensioning chain connected to said second bearing and a second tensioning sprocket on said third shaft and connected to said second tensioning chain.

5. The combination of claim 3 in which said first means comprises a first lever arm on said third shaft and carrying said first bearing on its outer end and in which said second means comprises a second lever arm on said third shaft and carrying said second bearing on its outer end.

6. The combination of claim 3 which further comprises a stop to prevent movement of said shafts toward each other, said stop being manually releasable.

7. The combination of claim 5 in which said resilient means comprises a third lever arm on said third shaft and spring means connected to said third lever arm to apply torque to said third shaft.

8. The combination of claim 7 which further comprises a rod pivotally connected to said third lever arm, and a clamp on said frame engaging said rod and permitting said rod to move in only one direction to move said first and second shafts apart.

9. Means for compensating for conveyor wear comprising, a first continuous conveyor, a second continuous conveyor of substantially the same length as said first conveyor, a first shaft, a substantially parallel second shaft, sprockets on said first and second shafts supporting said conveyors, first and second bearings rotatively supporting opposite ends of one of said shafts, mounting means for said first and second bearings arranged to permit movement of each said bearing independently of the other in a direction transverse to said shafts, a third shaft substantially parallel to said first and second shafts, means independently connecting each said bearing with said third shaft, and resilient means for applying torque to said third shaft to maintain greater tension on the shorter of said conveyors.

10. Means for compensating for conveyor wear comprising, a first continuous conveyor, a second continuous conveyor of substantially the same length as said first conveyor, a first shaft, a substantially parallel second shaft, sprockets on said first and second shafts supporting said conveyors, first and second bearings rotatively supporting opposite ends of one of said shafts, mounting means for said first and second bearings arranged to permit movement of each said bearing independently of the other in a direction transverse to said shafts, a third shaft substantially parallel to said first and second shafts, a first chain connected to one said bearing at one end and connected to said third shaft at its other end whereby turning of said third shaft moves said one bearing in its mounting means, a second chain connected to the other said bearing at one end and connected to said third shaft at its other end and whereby turning of said third shaft moves said other bearing in its mounting means, and resilient means connected to said third shaft applying torque thereto to tighten said first and second chains to tighten said conveyors, whereby as long as one conveyor is longer than the other, the major load is applied to the shorter conveyor.

11. Means according to claim 10 whereby said resilient means comprises a tensioning sprocket on said third shaft, a tensioning chain on said third sprocket and connected thereto, and a spring on the opposite end of said tensioning chain tending to tighten said tensioning chain.

References Cited in the file of this patent

UNITED STATES PATENTS

| | | |
|---|---|---|
| 1,268,388 | Rukes | June 4, 1918 |
| 1,523,988 | Vance | Jan. 20, 1925 |

FOREIGN PATENTS

| | | |
|---|---|---|
| 590,625 | Great Britain | July 23, 1947 |
| 910,341 | France | Jan. 28, 1944 |